July 2, 1940.  H. O. DROTNING ET AL  2,206,811
PHOTOGRAPHIC SHUTTER
Filed Feb. 11, 1939  2 Sheets-Sheet 1

Inventors
Henry O. Drotning
Lawrence R. Martin
By
Attorneys

July 2, 1940.  H. O. DROTNING ET AL  2,206,811
PHOTOGRAPHIC SHUTTER
Filed Feb. 11, 1939   2 Sheets-Sheet 2
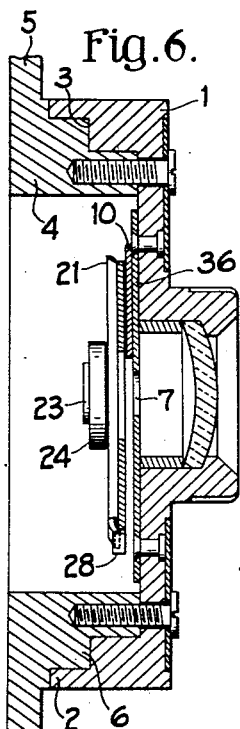
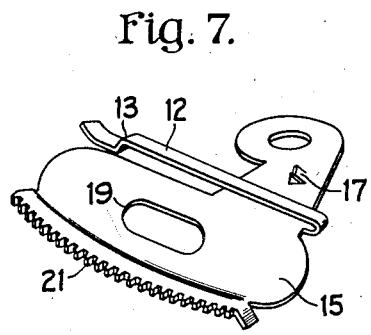
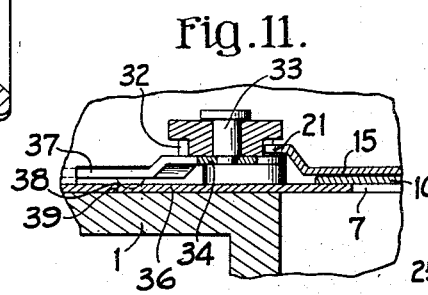
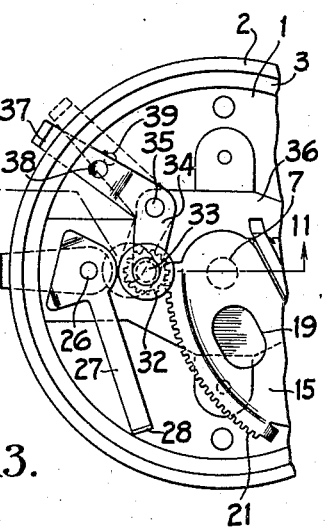
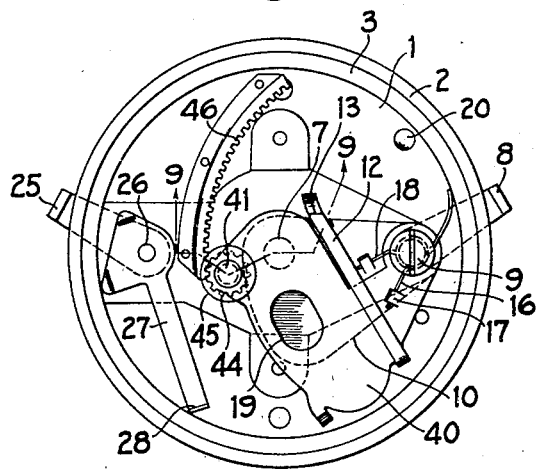
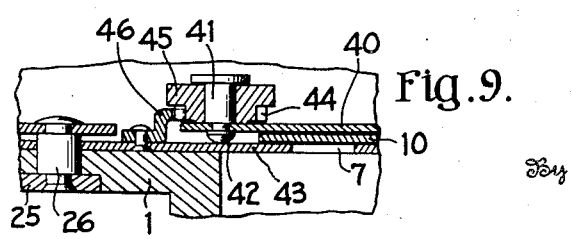
Inventors
Henry O. Drotning
Lawrence R. Martin Patented July 2, 1940

2,206,811

UNITED STATES PATENT OFFICE 2,206,811

PHOTOGRAPHIC SHUTTER

Henry O. Drotning and Lawrence R. Martin, Rochester, N. Y., assignors to Eastman Kodak Company, Rochester, N. Y., a corporation of New Jersey Application February 11, 1939, Serial No. 255,914

10 Claims. (Cl. 95—60)

This invention relates to photography and more particularly to shutters for photographic cameras.

One object of our invention is to provide a simple and inexpensive camera shutter with which a single, relatively slow speed exposure can be made. Another object of our invention is to provide such a shutter with a mechanism which will always produce exposures of the same speed regardless of the position in which the shutter is held during an exposure. Another object of our invention is to provide a shutter with a speed regulating device and to provide a means for varying the retarding action of the speed regulating device either for the purpose of initially regulating the speed of the shutter or for providing a shutter in which more than one exposure can be produced. Other objects will appear from the following specification, the novel features being particularly pointed out in the claims at the end thereof.

One of the difficulties in making an inexpensive shutter for cameras is the fact that cameras are held in various positions for making exposures so that gravity frequently affects the speed of exposure when cameras are held in certain directions. We have provided a flywheel type of retarding device which overcomes the usual directional difficulties and which has been found to provide accurate exposures regardless of the position in which the shutter is held. Moreover, such a shutter accomplishes this without the use of comparatively heavy springs so that in pressing a trigger the operator does not have to work against a relatively heavy spring, tending to shake the camera.

Coming now to the drawings, wherein like reference characters denote like parts throughout, Fig. 1 is a plan view of the shutter casing removed from a camera showing the shutter parts in position for an exposure;

Fig. 6 is a vertical section through the shutter casing and a portion of a camera to which it is attached;

Fig. 7 is a perspective view of the shutter blade removed from the shutter;

Fig. 8 is a rear plan view of a modification of the shutter shown in the preceding figures showing the parts in condition for an exposure;

Fig. 9 is an enlarged fragmentary sectional detail on line 9—9 of Fig. 8;

Fig. 10 shows a modification of the shutter shown in the first four figures, this view being a plan view of a shutter, parts of which have been broken away;

Fig. 11 is an enlarged fragmentary sectional view taken on line 11—11 of Fig. 10;

Fig. 12 is an enlarged fractionary detailed section of a means for altering the retarding effect of the flywheel which may be used as a modification of our shutter, and;

Fig. 13 is an enlarged fractionary detail partially in section on line 13—13 of Fig. 12.

Figure 1:
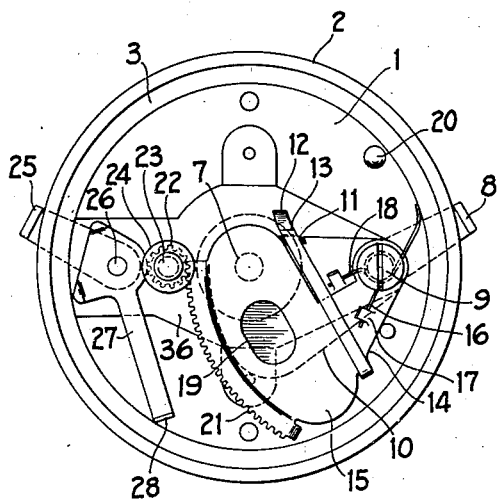

For inexpensive cameras we have found it desirable to provide a shutter which can be directly mounted on a front or fixed extension of a camera body so that in the drawings the shutter is indicated as being mounted in a shutter casing 1 which has an upstanding flange around the edge 2 preferably including a rabbet 3 which can be attached to a front extension tube 4 of a camera 5 as shown in Fig. 6, this tube having a rabbeted portion 6 which interfits with the rabbeted portion 3 of the shutter casing. As will be seen from Fig. 6, the shutter casing is reversed from its usual application in that it does not require a shutter cover plate as the casing is directly fastened to the camera.

Figure 3:
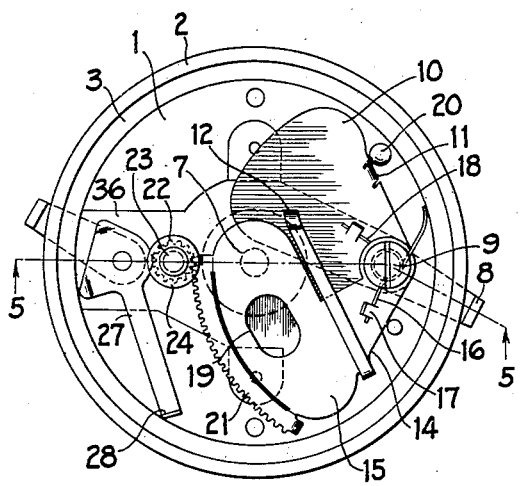
Fig. 3 is a view similar to the preceding figures but with the shutter parts in position after an exposure has been made but before the trigger has been released.

As indicated in Fig. 1, the shutter casing 1 is provided with the usual central aperture 7 through which light may pass to a film to make an exposure when the shutter mechanism is operated by means of a trigger 8 which extends outside of the shutter casing, the trigger being carried by a shaft 9 to which is attached a cover blind 10 as best shown in Fig. 3. The cover blind is provided with a latch element 11 along one edge adapted to be engaged by a spring latch 12 which has a downwardly formed latch member 13 for engaging the upwardly formed latch element 11 on the cover blind. The spring arm 12 is carried by one edge 14 of the shutter blade 15 which is mounted to turn freely on the post 9 and which is normally moved into the position shown in Fig. 1 by means of a spring 16 encircling the post having one edge resting on the flange 2 of the casing and the other end being caught beneath the lug 17 in the shutter plate. A second spring 18 normally holds the cover blind in the position shown in Fig. 1 in which position the spring latch 12 holds the two parts together.

Figure 2:
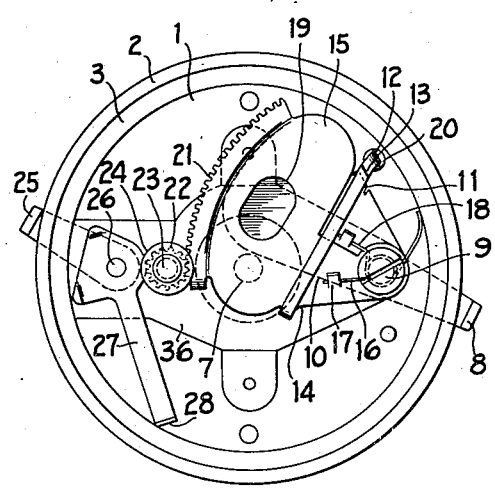
Fig. 2 is a view similar to Fig. 1 but with the trigger depressed almost to the position in which the shutter blade is released to make an exposure.

Thus, when the trigger 8 is moved from the position of Fig. 1 to that shown in Fig. 2, the blade and cover blind lie together so that the cover blind completely covers the aperture 19 in the shutter blade through which an exposure is made. As soon as the trigger reaches the position shown in Fig. 2 the end of the spring latch 12 rides up over a suitable projection such as a stud 20 raising the latch member up and releasing the lug 11 permitting the shutter blade 15 to swing under the impulse of its spring 16 from the position shown in Fig. 2 to the position shown in Fig. 3.

This swinging movement causes the aperture 19 to pass the aperture 7 so as to make an exposure. Inexpensive cameras frequently have single lenses or perhaps achromatic lenses which are of comparatively small aperture, usually from f.12 to f.16 so that the movement of a light shutter blade is frequently too fast to give the necessary exposure with normal films. In order to retard the movement of the shutter blade 15 under its spring 16, we prefer to form a gear segment 21 on the periphery of the shutter blade. This gear segment rotates about the pivot 9 and may either be formed directly on the shutter blade itself or it may be formed from a gear segment attached to the shutter blade.

In the form shown in the first 9 figures, the gear segment is always in mesh with a pinion 22 carried by a shaft 23 to which a small flywheel 24 is permanently attached. This flywheel is rotated in a counter-clockwise direction with reference to Fig. 1 when the trigger is depressed and in a reverse direction when the shutter blade is released.

When the shutter blade is released it is always moved by its spring 16 and since it is always in mesh with the weighted pinion, the retarding action is always the same and since this pinion rotates a number of times, the direction or position in which the shutter is held does not affect the speed of the shutter. Where only a single instantaneous speed is desired, it is customary to make the speed 1/25 second. We have found that this can readily be accomplished with the parts shown in the first four figures of approximately the proportion shown in these figures. If it is desired to have a faster exposure the weight 24 may be reduced or, of course, by altering the size of the pinion 22, its retarding action will likewise be affected.

Figure 4:
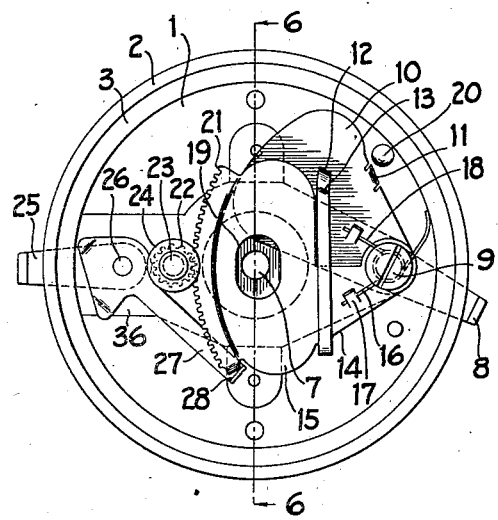
Fig. 4 is a view similar to the preceding figures but with the shutter blade halted in its intermediate position to produce a prolonged exposure.
Figure 5:
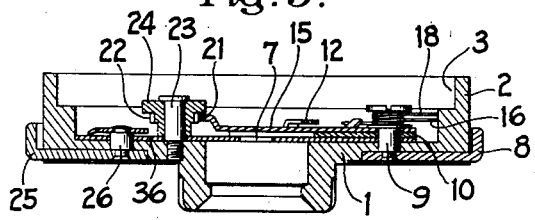
Fig. 5 is a section taken on line 5—5 of Fig. 3.

It is desirable some times to make a prolonged exposure and for this reason the shutter is equipped with a so-called "bulb" lever 25 carried by a shaft 26 passing through the shutter casing and carrying on the inside of the shutter casing an arm 27 with an upstanding end 28 adapted to be swung into the path of the shutter blade 15 as indicated in Fig. 4. In this figure, the shutter blade has been released by depressing the trigger 8 and the spring latch 12 has been released but the shutter is stopped by the arm 27 with the aperture 19 over the aperture 7. The exposure will therefore continue until the trigger is released, at which time the cover blind will move down over these apertures. After the exposure is completed, the operator may move the "bulb" lever to the position shown in Fig. 1, permitting the parts to return to the Fig. 1 position without, however, allowing light to pass through aperture 7.

If a slightly more expensive type of shutter is desired, in which two exposures are required, the structure shown in Fig. 10 may be used. This shutter is exactly like the shutter described in the preceding figures with the exception that the pinion 32 is carried by a shaft 33 supported on one end 34 of a bell crank lever pivoted at 35 to the shutter mechanism plate 36 and having an arm 37 extending outside of the shutter casing. This arm has a downwardly extending protuberance 38 which may snap into either one of two apertures 39 so as to hold the pinion 32 either in mesh with the gear segment 21 or out of mesh with this gear segment. When in mesh, if desired, a shutter speed of 1/25 second may be obtained and we find that we can readily obtain an exposure of 1/100 second when the lever 37 is moved to hold the pinion 32 in an inoperative position. However, as above mentioned, the retarded speed is controlled entirely by the size of the pinion or the weight of the flywheel or both and the speed of the unretarded exposure is dependent upon the size and weight of the shutter blade and the size and strength of the spring 16 which actuates the blade. We have merely indicated a desirable combination of speeds in referring to 1/100 and 1/25 of a second as typical.

In Fig. 8 we have illustrated still another embodiment of our invention, in which the shutter blade 40 operates with a cover blind as above described, but differs from the preceding embodiment of our invention in carrying an upstanding shaft 41 having a rounded bottom portion 42 which may rest on a plate 43 and rotatably carrying a pinion 44 with a flywheel 45. Thus, the shutter blade itself carries the weighted pinion and in this instance the pinion is always in mesh with a fixed gear segment 46 which is concentrically arranged with the shutter blade pivot 9.

The action of the shutter is the same as described for the preceding figures in that the weighted pinion is always in mesh with its rack or gear segment and in that it rotates in a counter-clockwise direction with reference to Fig. 8 during the spring tensioning movement and in a reverse direction when the shutter is released to make an exposure. The rounded portion 42 of the shaft slides freely over the plate 43 and the exposures are always the same regardless of the position in which the shutter is held.

It is sometimes desirable to provide a factory adjustment so that the shutter can be initially set for a definite speed and it is sometimes desirable to provide a means for altering the retarding effect of the flywheel. In Figs. 12 and 13 we have shown one way of accomplishing speed adjustment with our invention as above described.

As indicated in Fig. 12, the flywheel 50 carries a pinion 51 and these parts are mounted on a stub shaft 52 carried by a bracket 53 attached to any suitable part of the shutter casing. The end of the shaft 52 fits into a bore 54 in a stud 55 having an inner flange 56 and an outer operating knob 57, this knob being provided with a pin 58 adapted to engage any one of a series of notches 59. The shaft 55 extends through the shutter casing member 1 so that the knob 57 may be operated from the exterior of the casing.

By drawing out on the knob and compressing a spring 60 the pin 58 may be set into a desired aperture 59 and in turning the knob 57 the tension on a spring 61 is altered, one end of this spring 62 being affixed to the flange 56 and the other end of the spring 63 being attached to the shaft 52 which fixedly carries the flywheel 50 and gear 51. Thus, the spring 61 affects the rotation of the flywheel. If the spring 61 is tensioned it will retard the operation of the flywheel. If it is untensioned it will partially reduce the effectiveness of the flywheel. In either case, the speed of the exposure may be more or less governed by the tension on the spring.

What we claim is:

1. In a shutter for cameras, the combination with a shutter casing having an exposure opening therein, of a pivoted shutter blade for covering and uncovering the exposure opening, a trigger, a cover bland pivotally mounted and movable by the trigger, a spring for the shutter blade, a latch between the cover blind and shutter blade for moving the latter by the former, means for releasing the shutter blade after it has been moved to a set position, means spaced from the pivotal support for the shutter blade for controlling the speed of movement thereof comprising a gear segment and weighted pinion, each having meshing gear teeth, one part being carried by the shutter blade and the other by the shutter casing, the weighted pinion tending to slow up the movement of the shutter blade through its engagement with the gear segment.

2. In a shutter for cameras, the combination with a shutter casing having an exposure opening therein, of a pivoted shutter blade for covering and uncovering the exposure opening, a trigger, a cover blind pivotally mounted and moveable by the trigger, a spring for the shutter blade, a latch between the cover blind and shutter blade for moving the latter by the former, means for releasing the shutter blade after it has been moved to a set position, means spaced from the pivotal support for the shutter blade for controlling the speed of movement thereof comprising a gear segment and weighted pinion, the gear segment being mounted on the shutter casing, and the weighted pinion being pivotally attached to the shutter blade in position to mesh with said gear segment.

3. In a shutter for cameras, the combination with a shutter casing having an exposure opening therein, of a pivoted shutter blade for covering and uncovering the exposure opening, a trigger, a cover blind pivotally mounted and moveable by the trigger, a spring for the shutter blade, a latch between the cover blind and shutter blade for moving the latter by the former, means for releasing the shutter blade after it has been moved to a set position, means spaced from the pivotal support for the shutter blade for controlling the speed of movement thereof comprising a gear segment and weighted pinion, said gear segment being attached to the shutter casing concentric with the shutter blade pivot, and a pivot carried by the shutter blade carrying said weighted pinion with the pinion in mesh with the gear segment.

4. In a shutter for cameras, the combination with an apertured shutter casing, of a shutter blade having an exposure opening therein pivotally mounted in the casing, a pivotally mounted cover blind, a trigger attached thereto, means for latching the blade and cover blind together for movement in one direction, a spring tending to move the shutter blade, and means for releasing the shutter blade from the cover blind to permit movement of the blade for making an exposure, a gear segment carried by the shutter blade spaced from its pivotal mount, and a weighed pinion meshing with the gear segment and adapted to retard the movement thereof.

5. In a shutter for cameras, the combination with an apertured shutter casing, of a shutter blade having an exposure opening therein pivotally mounted on the casing, a pivotally mounted cover blind, a trigger attached thereto, means for latching the blade and cover blind together for movement in one direction, a spring tending to move the shutter blade, and means for releasing the shutter blade from the cover blind to permit movement of the blade for making an exposure, a pivoted support for the shutter blade, a gear segment carried by the shutter blade spaced from the pivotal support to swing thereabout, a pivotally mounted pinion meshing with said gear segment, and a flywheel carried by the pinion for retarding the movement thereof for obtaining a slow speed.

6. In a shutter for cameras, the combination with an apertured shutter casing, of a shutter blade having an exposure opening therein, a cover blind, a pivotal support for the shutter blade and cover blind, a trigger for moving the cover blind, means for latching the blade and cover blind together for movement in one direction, a spring tending to move the shutter blade, and means for releasing the shutter blade from the cover blind to permit movement of the blade for making an exposure, a pivotal support for the shutter blade, a gear segment carried by the shutter blade spaced from the pivotal support to swing thereabout, a pivotally mounted weighted pinion meshing with said gear segment for retarding the movement thereof for obtaining a slow speed, and a lever carrying the pivotally mounted weighted pinion for moving the pinion into and out of mesh with the shutter gear segment.

7. In a shutter for cameras, the combination with an apertured casing, of a pivot carried thereby, a shutter blade movably mounted on the pivot for opening and closing the exposure opening, a gear segment carried by the blade adapted to swing about the pivot, a stud spaced from the shutter pivot and carrying a pinion meshing with the gear segment, and a weight carried by the pinion to turn therewith for retarding movement of the pinion and shutter blade, a cover blind mounted on the shutter pivot, a spring latch comprising two elements, one on the shutter blade and the other on the cover blind for normally holding the shutter blade and cover blind together, a protuberance carried by the shutter casing for releasing the latch, and a shutter trigger for moving the cover blind and shutter blade latched together in one direction until said latch is released by said protuberance.

8. In a shutter for cameras, the combination with a shutter casing including an exposure opening, a pivot carried thereby, a shutter blade movably mounted on the pivot for opening and closing the exposure opening, a gear segment carried by the blade adapted to swing about the pivot, a stud spaced from the shutter pivot and carrying a pinion meshing with the gear segment, and a weight carried by the pinion to turn therewith for retarding movement of the pinion and shutter blade, a cover blind mounted on the shutter pivot, a spring latch for normally holding the shutter blade and cover blind together, a protuberance carried by the shutter casing for releasing the latch, a shutter trigger for moving the cover blind and shutter blade latched together in one direction until said latch is released by said protuberance, a spring for moving the released shutter blade, and moving the gear segment retard including the weighted pinion to make an exposure through the exposure opening, and means for varying the retarding action of the weighted pinion, said means being operable from the outside of the shutter casing.

9. In a shutter for cameras, the combination with a shutter casing having an exposure opening therein, of a pair of spaced studs one on each side of the exposure opening, a shutter blade and a cover blind movably mounted on one stud, springs normally holding the shutter blade and cover blind in a position of rest, a spring latch for holding the shutter blade and cover blind latched together, a protuberance positioned to release the latch when said parts are moved to one extent of their movement, a trigger for moving the cover blind, a gear segment carried by the shutter blade, an aperture in the shutter normally covered by the cover blind and adapted when said latch is released to open and close the exposure opening, a pinion on the other stud meshing with the gear segment on the shutter blade, a flywheel for retarding movement of the shutter blade under the influence of said spring, and a spring connected to the flywheel for altering the retarding action thereof.

10. In a shutter for cameras, the combination with a shutter casing having an exposure opening therein, a pair of spaced studs carried by the shutter casing, a shutter blade and a cover blind movably mounted on one stud, springs normally holding the shutter blade and cover blind in a position of rest, a spring latch for holding the shutter blade and cover blind latched together, a protuberance positioned to release the latch when said parts are moved to one extent of their movement, a trigger for moving the cover blind, a gear segment carried by the shutter blade, an aperture in the shutter normally covered by the cover blind and adapted when said latch is released to open and close the exposure opening, a lever mounted on the other stud, a pivoted support on the lever, a connected pinion and flywheel carried by the pivotal support, and means for swinging the support to mesh or unmesh the pinion and gear segment for conditioning the shutter for fast or slow exposures.

HENRY O. DROTNING.
LAWRENCE R. MARTIN.